(12) United States Patent
Starks et al.

(10) Patent No.: US 11,544,095 B2
(45) Date of Patent: *Jan. 3, 2023

(54) CONTAINER MANAGEMENT SYSTEM WITH A REMOTE SHARING MANAGER

(71) Applicant: MICROSOFT TECHNOLOGY LICENSING, LLC, Redmond, WA (US)

(72) Inventors: John Andrew Starks, Seattle, WA (US); Scott A. Brender, Kirkland, WA (US); Shaheed Gulamabbas Chagani, Redmond, WA (US); Ping Xie, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,775

(22) Filed: Oct. 29, 2019

(65) Prior Publication Data

US 2020/0409736 A1 Dec. 31, 2020

Related U.S. Application Data

(60) Provisional application No. 62/867,866, filed on Jun. 28, 2019.

(51) Int. Cl.
*G06F 9/455* (2018.01)
*G06F 16/22* (2019.01)
(Continued)

(52) U.S. Cl.
CPC ...... *G06F 9/45558* (2013.01); *G06F 9/44505* (2013.01); *G06F 9/44557* (2013.01);
(Continued)

(58) Field of Classification Search
CPC ............ G06F 9/45558; G06F 9/44505; G06F 2009/45562; G06F 2009/45595; G06F 2009/4557
See application file for complete search history.

(56) References Cited

U.S. PATENT DOCUMENTS

| 10,528,337 B1 | 1/2020 | Varadharajan Kannan |
| 10,534,671 B1 | 1/2020 | Zhao et al. |

(Continued)

OTHER PUBLICATIONS

"International Search Report and Written Opinion Issued in PCT Application No. PCT/US20/036533", dated Sep. 28, 2020, 13 Pages.

(Continued)

*Primary Examiner* — Dong U Kim
(74) *Attorney, Agent, or Firm* — Newport IP, LLC; Jacob P. Rohwer

(57) ABSTRACT

Methods, systems, and computer storage media for providing a set of common flat files in a composite image that can be mounted as a container (i.e. composite container) to support isolation and interoperation of computing resources. Container management is provided for a container management system based on a composite image file system engine that executes composite operations. In particular, a remote sharing manager operates with a composite engine interface to support generating composite images configured for split layer memory sharing, split layer direct access memory sharing, and dynamic base images. In operation, a plurality of files and a selection of a remote sharing configuration for generating a composite image are accessed. The composite image for the plurality of files and the remoting sharing configuration is generated. The composite image is communicated to cause sharing of the composite image, sharing of the composite image is based on the remote sharing configuration.

20 Claims, 9 Drawing Sheets

(51) Int. Cl.
*G06F 16/174* (2019.01)
*G06F 9/445* (2018.01)
*G06F 9/54* (2006.01)

(52) U.S. Cl.
CPC ............ *G06F 9/44589* (2013.01); *G06F 9/54* (2013.01); *G06F 16/1748* (2019.01); *G06F 16/2246* (2019.01); *G06F 2009/4557* (2013.01); *G06F 2009/45562* (2013.01); *G06F 2009/45595* (2013.01)

(56) References Cited

U.S. PATENT DOCUMENTS

| | | | |
|---|---|---|---|
| 2018/0060091 A1* | 3/2018 | Ciano | G06F 9/45558 |
| 2018/0095973 A1* | 4/2018 | Huang | G06F 8/63 |
| 2018/0129479 A1* | 5/2018 | McPherson | G06F 9/45558 |
| 2018/0275987 A1 | 9/2018 | Vandeputte | |
| 2018/0349150 A1* | 12/2018 | Wong | G06F 9/4493 |
| 2019/0303185 A1 | 10/2019 | Paithankar et al. | |
| 2019/0317843 A1* | 10/2019 | Zhao | G06F 9/544 |
| 2019/0370113 A1* | 12/2019 | Zhao | G06F 9/545 |
| 2020/0233651 A1 | 7/2020 | Shantharam et al. | |
| 2020/0409723 A1 | 12/2020 | Starks et al. | |
| 2020/0409921 A1 | 12/2020 | Starks et al. | |

OTHER PUBLICATIONS

"International Search Report and Written Opinion Issued in PCT Application No. PCT/US20/036534", dated Oct. 1, 2020, 14 Pages.
"International Search Report and Written Opinion Issued in PCT Application No. PCT/US20/036544", dated Oct. 1, 2020, 14 Pages.
"Non Final Office Action Issued in U.S. Appl. No. 16/667,771", dated Jun. 1, 2021, 19 Pages.
"Final Office Action Issued in U.S. Appl. No. 16/667,771", dated Oct. 18, 2021, 24 Pages.
"Non Final Office Action Issued in U.S. Appl. No. 16/667,771", dated Apr. 5, 2022, 7 Pages.
"Non Final Office Action Issued in U.S. Appl. No. 16/667,776", dated Mar. 16, 2022, 12 Pages.
"Notice of Allowance Issued in U.S. Appl. No. 16/667,771", dated Jul. 25, 2022, 5 Pages.
"FInal Office Action Issued in U.S. Appl. No. 16/667,776", dated Nov. 3, 2022, 12 Pages.

* cited by examiner

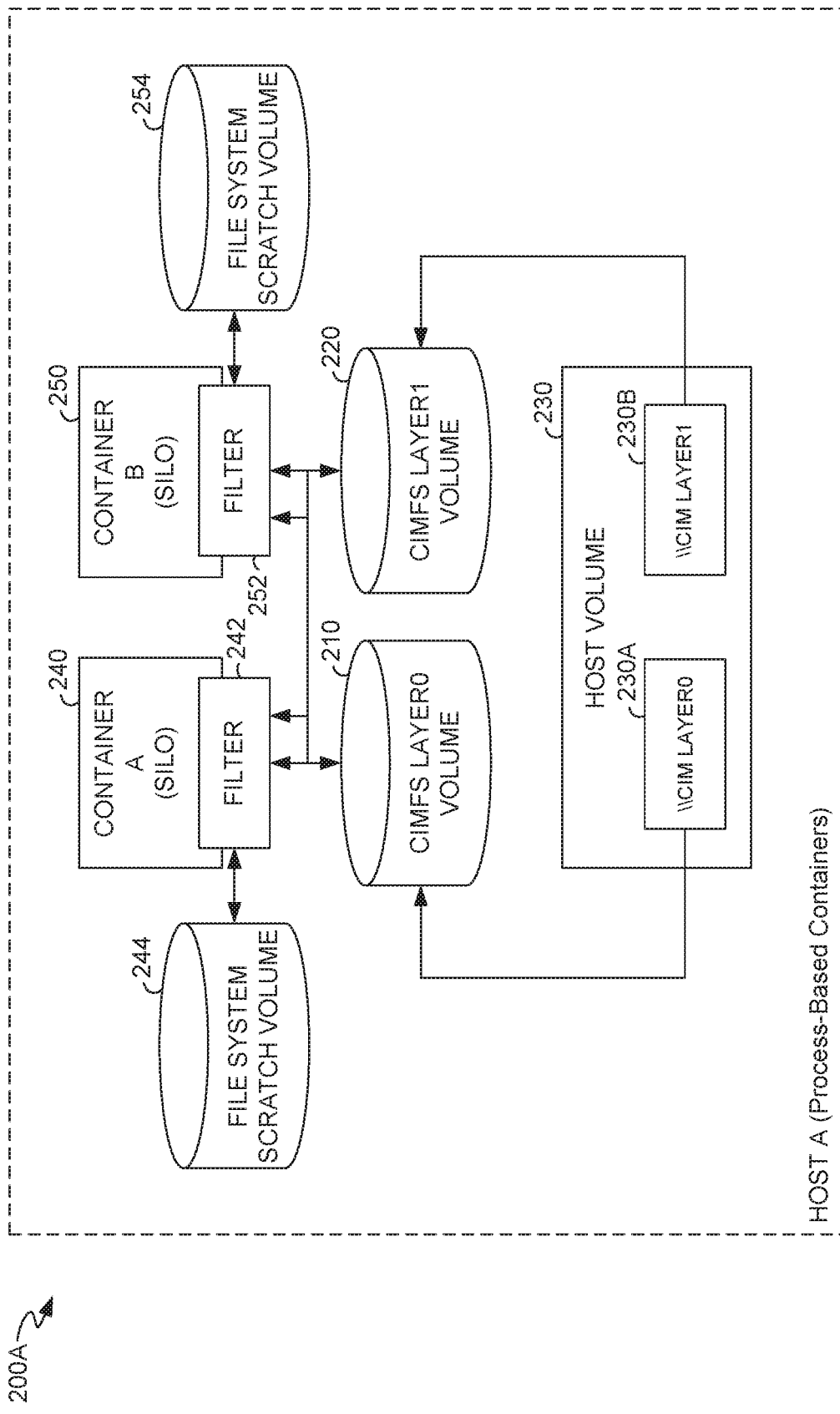

CONTAINER MANAGEMENT SYSTEM WITH A REMOTE SHARING MANAGER

CROSS-REFERENCE TO RELATED APPLICATIONS

This application claims priority of U.S. Provisional Application No. 62/867,866, filed Jun. 28, 2019, and titled "Container Management System With A Composite Image File System Engine," the content of which is hereby incorporated in its entirety.

BACKGROUND

Users often rely on computing resources such as applications and services to perform various computing tasks. Distributed computing environments can support building, deploying, and managing applications and services. Users and enterprises are moving away from traditional computing environments to run their applications and services on distributed computing environments. Distributed computing environments implement operating system (OS) level virtualization (e.g., container management systems) to support multiple isolated computing instances in distributed computing environments.

By way of example, a container management system (or platform) with a container engine (e.g., DOCKER) may support developing and delivering software in packages called containers. Containers are created from images that specify their precise contents. Containers, in particular, can be supported (e.g., managed, created, mounted, and accessed) using a container management system that includes several components that are integrated and communicate to provide container functionality. Conventional container management systems primarily support container images with traditional container image layouts. For example, a traditional container image layout can include directory tree structures on disk that introduce inefficiencies in container management operations. As distributed computing environments increasingly support applications and services, it is important to provide operations for efficient creation and management of container resources to improve computing operations, in particular, computing operations for resource isolation functionality in distributed computing environments

SUMMARY

Various aspects of the technology described herein are generally directed to systems, methods, and computer storage media, for among other things, providing a set of common flat files in a composite image that can be mounted as a container (i.e., composite container) to support isolation and interoperation of computing resources. In particular, container management is provided for a container management system based on a composite image file system engine (i.e., APIs of a Composite Image File System "CIMFS"). The composite image file system engine ("composite engine") provides a variety of composite image file system engine operations ("composite operations") that are executed to support resource isolation and operating system (OS) virtualization functionality. For example, a DOCKER platform (container management system) can be integrated with components (e.g., APIs and machine code of composite operations) of a file system (i.e., CIMFS). The APIs can support different types of functionality of CIMFS, such as, generating (e.g., via a container engine interface) different types of CIMFS images (i.e., basic composite images, composite images with sharing functionality, composite images with pre-computed hashes or composite images with pre-aligned executables). The APIs and the container engine interface can further support performing composite operations for container management with the container engine including mounting the different types of CIMFS images and communicating with drivers (i.e., remote interfaces or client interfaces) that support accessing or executing from the different types of CIMFS images.

At a high level, composite operations are integrated into the container management system such that the composite engine can implement versatile features (e.g., container engine interface, remote sharing manager, and layout manager system) of a composite image (i.e., flat file image). The composite engine can be a library that defines a logic (i.e., algorithm or instructions) for the composite image file system "CIMFS". The library defines interfaces for invoking specific behaviors of the CIMFS, where behaviors include instructions on how to create and access a set of common flat files in a composite image. The logic includes operations (or instructions) that can be performed using the structure (e.g., flat file and namespace) of the CIMFS. The composite engine is shared (i.e., not exclusively kernel mode or user mode), instead it can be used by multiple configurations of resource isolation and virtualization that may not have different types of connections with each other. The composite engine is organized so it can be reused by independent programs or sub-programs that do not know details of the library while the interface handles providing the CIMFS functionality (e.g., mounting, sharing, and accessing different resources).

In operation, the composite engine executes composite operations for composite images in different configurations and different host environments. In particular, the composite engine provides a variety of composite operations that are executed to support resource isolation and operating system virtualization functionality. The composite engine includes several different components including: a container engine interface, remote sharing manager, layout manager, and additional APIs (i.e., remote interfaces, and layout manager client interface). The different components can be integrated into a container engine or hosts (or host drivers or interfaces) to provide the functionality described herein. As such, aspects of the technical solution described in the present disclosure are directed towards improving container management in a container management system based on a composite engine. The composite engine, the container engine interface, remote sharing manager, layout manager, and additional APIs (i.e., remote interfaces, and layout manager client interface) provide efficient creation and management of composite images and composite containers for improved resource isolation functionality in a distributed computing environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.+

BRIEF DESCRIPTION OF THE DRAWINGS

The technology described herein is described in detail below with reference to the attached drawing figures, wherein:

FIG. 2A is an example container management system environment for providing composite operations using a composite image file system engine, in accordance with aspects of the technology described herein;

DETAILED DESCRIPTION

Figure 1A:
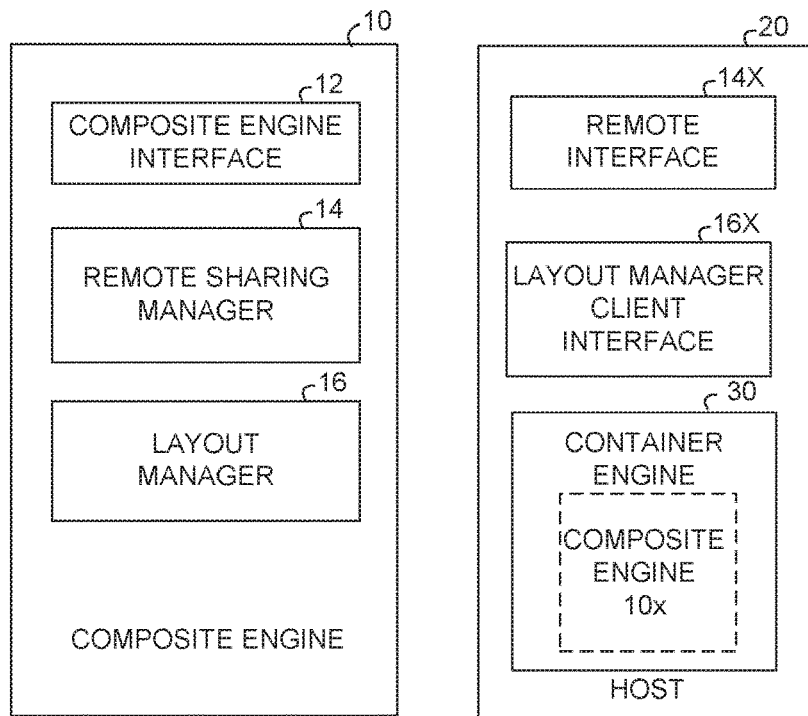
FIG. 1A is a block diagram of an example container management system environment for providing composite operations using a composite image file system engine, suitable for use in implementing aspects of the technology described herein.

Overview of Aspects of the Technical Problem, Technical Solution, and Technological Improvement Distributed computing environments implement resource isolation and operating system (OS) level virtualization (e.g., container management systems) to support multiple isolated computing instances in distributed computing environments. By way of background, a container management system (or platform) (e.g., DOCKER) may support developing and delivering software in packages called containers. Containers are generally isolated from each other and bundle their own software, libraries and configuration files; however, they can communicate with each other through well-defined channels. Containers are run by a single operating system kernel and this is more lightweight than virtual machines. A single server or virtual machine can run several containers simultaneously. Containers are created from images that specify their precise contents. Containers in particular can be supported (e.g., managed, created, mounted, and accessed) using a container management system that includes several components that communicate to provide container functionality.

Conventional container management systems primarily support container images with traditional container image layouts that include directory tree structures that introduce inefficiencies in container management operations. In particular, classic container images include layers of the container, where the layers are made up of individual files laid out on the file system of host. When implementing a classic container image (e.g., via a compressed .tar file) the individual files are extracted. Conventionally layers are a directory hierarchy of files in a tree structure which are extracted slowly from the .tar and stored on disk. Container management can include operations on container images including container image extraction, manipulation, and access that put strain on the host operating system supporting the container images. For example, when container extraction is slow this can cause a bottleneck for initialization of containers and other operations in the container management system. As such, an alternative approach, for providing a container management system, that can provide extraction, manipulation, and access container management operations without latency would improve computing operations for more efficient resource isolation and OS virtualization functionality.

Embodiments of the present invention are directed to simple and efficient methods, systems, and computer storage media for providing a set of common flat files in a composite image that can be mounted as a composite container to support isolation and interoperation of computing resources. In particular, container management is provided for a container management system based on a composite image file system engine (i.e., APIs of a Composite Image File System "CIMFS") that provides a variety of composite image file system engine operations ("composite operations") that are executed to support resource isolation and operating system (OS) virtualization functionality. The composite engine includes several different components including: a container engine interface, layout manager, and composite engine remote interfaces. The different components can be integrated into a container engine or hosts to provide the functionality described herein.

By way of example, a container engine, (e.g., DOCKER) can support APIs and machine code that provide composite operations for composite engine interfaces to hosts, for different layouts of composite images, and for remote interfaces supporting CIMFS. Specifically CIMFS operates with a composite image, which is a flat image that represents an entire container image, and the composite image is also composed of multiple flat files. Further, the composite image can be implemented in different types of configurations and in different types of computing "host" environments as discussed in more detail below. In this regard, a container management system having CIMFS and the composite image can operate more efficiently (in several different configurations and computing environments) to meet different computing needs for resource isolation and operating system virtualization.

In operation, the container engine interface supports creating, mounting, and providing access (via a container engine) to and from composite images or composite containers. The composite images and composite containers are based on a container image layout designed to support flat files (i.e., a set of common flat files). The composite engine interface can further support layering and de-duplicating when generating composite image. The remote sharing manager operates with the composite engine interface to support generating composite images configured for split layer memory sharing, split layer direct access memory sharing, or dynamic base images. The composite images, generated based on the remote sharing manager functionality, operate with remote interfaces (e.g., host drivers) that support sharing functionality between components (i.e., containers, VMs, and host) of a container management system environment. The remote interfaces support accessing composite images and implementing composite file system functionality in different computing environments (i.e., host environments). The remote interfaces (e.g., composite engine APIs on host machines) allow the container engine to operate with different types of host environment configurations and functionality. The remote interfaces provide operations that support split layer memory sharing, split layer direct access memory, and other types of composite images and functionality.

The layout manager system includes a layout manager and the layout manager client interface. The layout manager operates with the composite engine interface to support generating composite images with optimized configurations (i.e., pre-alignment and pre-computed hashes) for executable files. The composite images (e.g., optimized composite images), generated based on the layout manager functionality, operate with a layout manager client interface the supports implementing the optimized configurations when the composite image is mounted as a composite container. Moreover, the layout manger supports generating composite images while simultaneously aligning executable code in the image. The layout manager also supports pre-computing hashes for a binary, such that the pre-computed hashes as used to validate the binaries on a host. An image that includes either or both the aligned executable code and the pre-computed hashes can be accessed using a layout manager client on a host machine. The layout manager client interface further supports executing the pre-aligned executable code and validating binaries using the pre-computed hashes. As such, the composite engine, a container engine interface, remote sharing manager, layout manager, and additional APIs and machine code (i.e., remote interfaces, and layout manager client interface) provide efficient creation and management of composite images and composite containers for improved resource isolation functionality in a distributed computing environment.

Overview of Example Environments for Providing Container Management Using a Composite Engine Aspects of the technical solution can be described by way of examples and with reference to FIGS. 1A, 1B, 2A, and 2B. With initial reference to FIG. 1A, FIG. 1A discloses a container management system environment 100 (i.e., technical solution environment "container management system") having a composite engine 10 with a container engine interface 12, remote sharing manager 14, and layout manager 16, and host 20 with remote interface 14X, layout manager client interface 16X, container engine 30 running an instance of the composite engine 10X. The container management system can have corresponding features and functionality as the container management system environment 600 described herein with reference to FIG. 6.

At a high level, a set of common flat files in a composite image can be mounted as a composite container to support isolation and interoperation of computing resources. In particular, container management is provided for the container management system based on composite operations of a composite engine that are executed to support resource isolation and operating system (OS) virtualization functionality. The composite engine includes several the components above that integrated into a host running a container engine to provide the functionality described herein.

Composite Engine Interface

The composite engine interface 12 is responsible for managing composite operations including creating, mounting, and providing access (using the container engine) to and from composite images or composite containers. The composite images and composite containers are based on a container image layout designed to support flat files (i.e., a set of common flat files). The composite engine interface 12 is responsible for creating the composite image as a flat file image. A composite image (i.e., flat file image) represents a container that is composed of the set of common flat files including one or more object ID files, one or more region files, one or more metadata (file system) files. The region files contain an encoding of the file metadata and data for the image, called the object store. Each file may be stored as a file object and the contents of the file. Each directory can be stored as a file object plus a list of directory entries, and so on. Different region types are stored in different files, so some of the region files store metadata, some store page-aligned file data (for larger files), and some store unaligned file data (for small files).

Figure 1B:
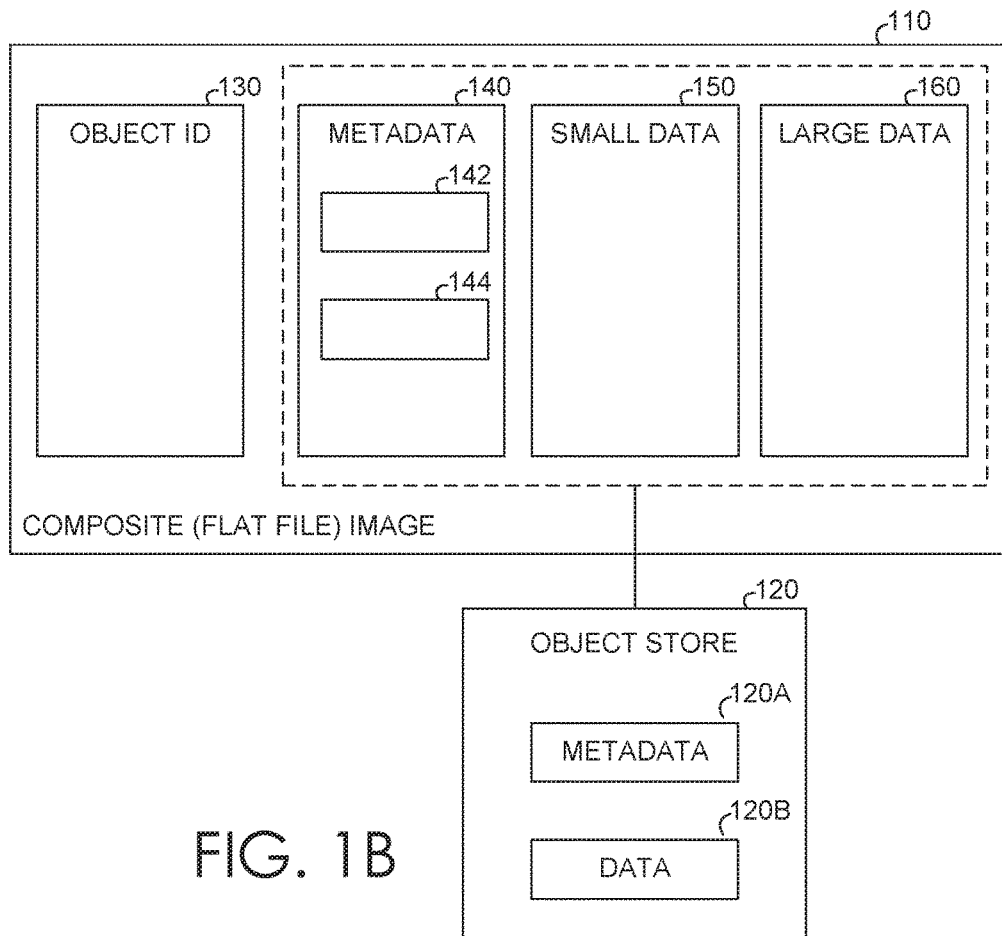
FIG. 1B is a block diagram of an example composite (flat file) image, suitable for use in implementing aspects of the technology described herein.

Object pointers may be stored as "region offsets". For example, region offsets can include a 48-bit byte offset into a region file and a 16-bit region index. There can therefore be up to 65535 regions, although a newly created image can be created with at most one region file per type. The object ID files together can contain a mapping from the SHA512 digest of each region object to its region offset. These are used during image construction to de-duplicate data: if a new object is being added, and this object is already present in an existing region of the same type (as determined by looking up its digest in the object ID file), then the object does not need to be persisted again and can be referenced at its existing region offset. The object ID files are not used at runtime. A file system file contains the region offset of a file system object, which contains the region offset of the file table directory, the file ID of the root directory, and the region offset of the uppercase table used for string case comparisons. With reference to FIG. 1B, FIG. 1B includes an illustration of a composite (flat file) image 110 with corresponding feature discussed above. The composite flat file image 110 includes object store 120, and object ID 130. The object store 120 further includes metadata 120A and data 120B. In some embodiments, the object store may include metadata 140, small data 150, large data 160, metadata 140 has region types 142 and 144, as discussed above.

The composite engine interface 12 (e.g., via composite engine interface 10X) is also responsible for mounting composite images as composite containers (or file system). The composite engine interface 12 (i.e., as a mounting driver) performs a mount operation that creates a file system instance (i.e., composite container) for the composite image. The file system (i.e., mounted composite image as composite container) is created as its own volume, while the composite container still has access to the host file system volume. A composite engine interface 12 can specifically be an Application Programming Interface (API) that can be used to mount the composite image as a composite container. The composite engine interface supports providing the composite image as a composite container, while previously, the classic container image files were simply mounted to a location of the file system on the host.

By way of comparison, classic containers images can be distinguished from composite containers based on the difference in how each of the types of containers is written (i.e., random writes versus sequential writes). Classic containers images are written using an allocations of random locations on disk using a tree data structure. The tree-based writing is inherently slow compared to the sequential writing supported when mounting the composite image. Writing the files to disk when mounting the composite image is performed sequentially to increase the speed in which the region files are written.

A composite image when mounted as a composite container (file system) can then have files associated with the file system exposed in their corresponding tree structure. The tree structure is stored as metadata that is accessed on a composite container to show the files in a tree structure, even though the files are "flat" on disk. The metadata file includes a directory tree structure and points to a location in the region files the data is stored. The metadata can include the attributes of the files, time stamps, and extended attributes. This is contrasted with the region files that include data; however the metadata points to the location of the data in the region file. The composite engine interface 12 reads out the sequentially written composite image files and the directory structure metadata to present the file in a tree structure format to via an interface. Advantageously, the files are not altered on disk (i.e., remain in sequence) while presented in the tree structure format.

Layering

The composite engine interface 12 can also support layering or altering or layering composite (or flat) images where existing composite images can be altered or extended by adding additional region files. A new flat image can be constructed using an old one as the basis by creating links from the existing region files to a new location and extending an existing region. Layering supports portability of composite files in that new composite images do not have to be created from scratch. Adding a .NET layer can be done using an existing composite image. Layering support a modular feature of composite images, where composite images (e.g., metadata, small data, or large data) can be attached or detached from other composite images. Layering composite images includes adding more region files to an existing set of region files, which can be composited into a new layered composite image. With a first composite image that already has a first set of files, a second set of files can be merged to generate a second "layered" composite image. The second composite image has a new set of files can be referenced to operate as a layered composite container when the second layered composite image is mounted. The added set of files can include new volumes, new files, directories, that are integrated or operate independently of the original set of files. In particular, the metadata file of the new composite file may include the tree structure to support accessing both the first composite image files and the second composite image files.

By way of example, a customer wants to create a new composite image for a .NET framework. The customer already has a base that the .NET framework can use. Instead of starting with a new composite image and build a base layer and then add the .NET framework layer, the customer can instead have the .NET framework as its own set of common (composite image) files and then "composes" a new layered composite image by merging the set of common flat files of the base layer and the new .NET framework. Layering improves portability because the base layer (set of common flat files) can be reused as needed. Layering also improves how storage space is used in that the base layer can be shared between a composite container using only the base layer and another composite container using the base layer and the .NET framework layer. In this regard, the composite images can be described as stackable because the composite images can be made up of disparate of separate modular parts. It is possible to keep layering (e.g., an APP layer) different layers of the set of common (flat) files on either the base layer alone or on the .NET framework and the base layer.

As the layers are added, the metadata layer of each new layer stores at least some metadata of the files in the previous layer. While the base layer metadata file may know only of its common set of flat files, the metadata of the .NET framework layer can understand both the first and second layers. Pointers can be used by the .NET framework metadata file to tracking the location of files from each of the different layers. A directory structure can be built using the metadata of the second layer to view both the first layer and the second layer. Each additional stacked layer has a metadata file managing even more pointers and references to the previous layers.

Additionally, a single image can contain any number of file systems; this allows for combining the container and VM images into a shared set of regions. To alter an existing file system (e.g. while extracting a layer of a container image), modified files and directories are added to new region files. To reference these new files, existing directories are updated in a copy-on-write fashion by copying them with modifications to the new region files. Eventually the root directory is updated, and a new file system object is constructed to refer to that. Finally, a new file system file can be written pointing to this new object. Alternatively, a peer file system can be constructed by using the existing region files but starting from an empty root directory. Any data that is shared between the peer file systems will be de-duplicated by the object hash files, but no sharing within the file system directory tree need occur.

De-Duplication

Advantageously, as mentioned, layering can help save storage space in that files that are common between layers are de-duplicated. For example, a file in the .NET framework that already exists in the base layer is not added to the composite image. A pointer is stored in metadata so the file can be shared. De-duplication refers to the capacity for composite engine interface 12 to know what files already exist in a composite image (e.g., using a tracking mechanism) and add pointers to data of the file that needs to be shared. De-duplication can occur when the .NET framework layer is being merged with the base layer. This is particularly helpful for container file systems that tend to have several small files in common.

Sharing

Figure 2B:
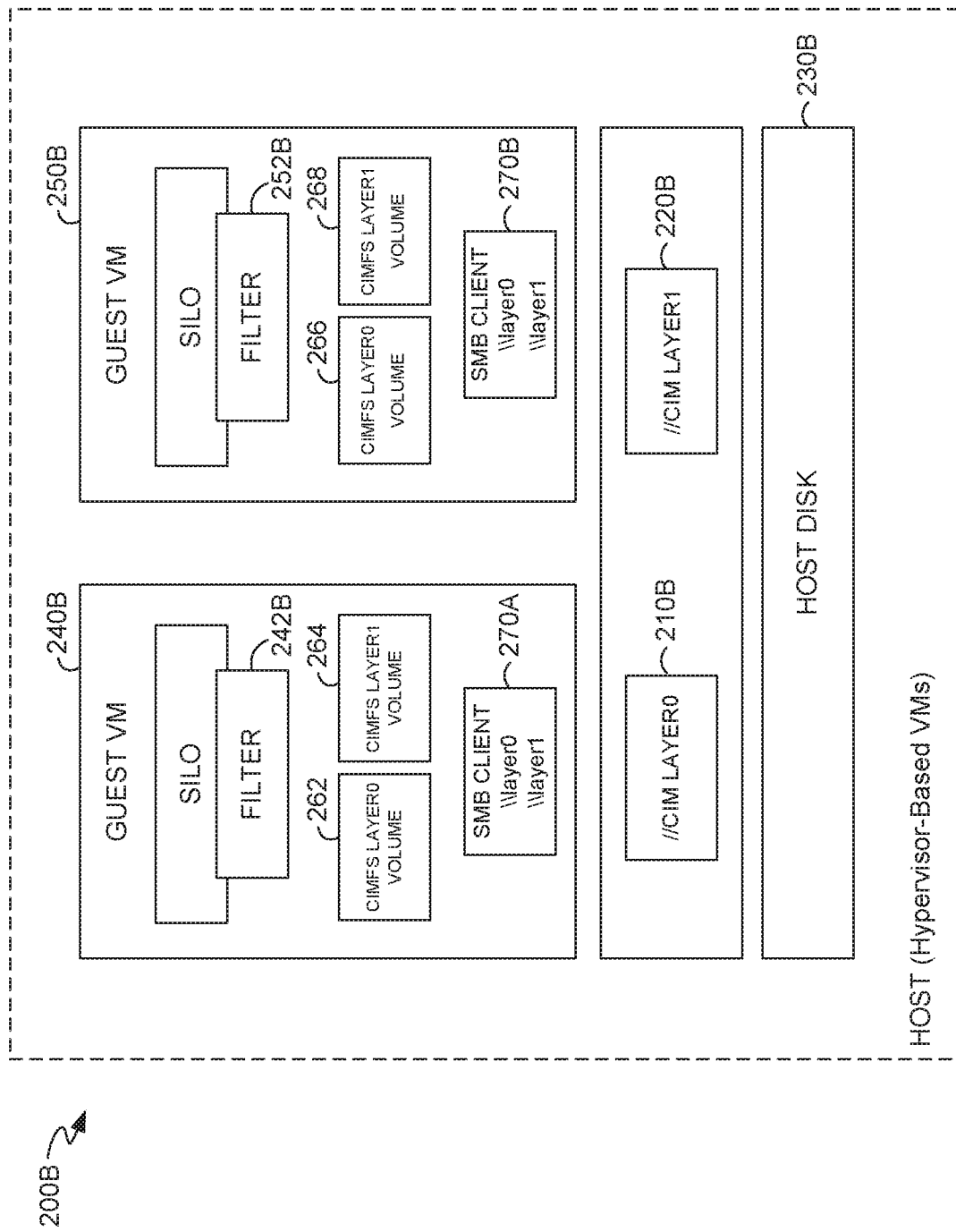
FIG. 2B is an example container management system environment for providing composite operations using a composite image file system engine, in accordance with aspects of the technology described herein.

The composite engine interface can support sharing composite image files and can operate with remote interfaces running on host machines. Remote interfaces may refer to composite engine APIs, machine code, or drivers and driver components that are added to components or programs at a host machine to support understanding and using CIMFS, as discussed below in more detail. Turn to FIG. 2A and FIG. 2B, each of FIG. 2A and FIG. 2B discloses a container management system (e.g., container management system environment 100 where the features (e.g., container image "CIM" layer volumes, container image file systems "CIMFS" layers, isolated points (SILO), filters, and server message blocks (SMB)) and functionality of the present invention can be performed. In particular, FIG. 2A discloses a first model hosting environment 200A (for process-based containers) having CIMFS layer0 volume 210, CIMFS layer1 volume 220, host volume 230 (including CIM layer0 230A and CIM layer1 230B), container A 240 with filter 242 and file system scratch volume 244, and container B 250, filter 252, and file system scratch volume 254. FIG. 2B discloses a second model hosting environment 200B for (hypervisor-based VMs) having CIM layer0 210B, CIM layer1 220B, host disk 230B, guest VM 240B with filter 242B, CIMFS layer0 volume 262, CIMFS layer1 volume 264, and SMB client 270A, and guest VM 250B with filter 252B, CIMFS layer0 volume 266, CIMFS layer1 volume 260, and SMB client 270B.

At a high level, composite images and CIMFS can be used in two different types of host scenarios. In the first host model, FIG. 2A, the host supports processed-based containers, where the container does not mount the composite container but the container can access the composite container files. Processed-based containers do not have a guest-to-host transition framework; no hypervisor is separating these OS virtualization instances. As such, the composite container is mounted on the host machine and containers (sharing the same kernel) can access the composite container (e.g., using a remote interface on the host). In the second host model, FIG. 2B, the host supports isolated VM-containers (via hypervisor-based VMs), the composite images can be mounted (i.e., direct access) as composite containers in the VMs to avoid guest-to-host transitions with some types of data requests to region files of the composite container. In the both host scenarios, CIMFS can support file sharing.

Split Layer Memory Sharing Component

By way of background, classic containers can share an image (i.e., memory sharing) to save storage space. Composite images can be constructed in a first configuration to have all the layers in a single composite image. However, in a second configuration the composite image can be constructed so that each layer has its own composite image (i.e., a set of common flat files). This second configuration is referred to as split layers of the composite image. When composite images are created with split layers, memory sharing is possible. For efficiency purposes in OS virtualization, a large number of containers are often implemented on the same host (i.e., memory density). If the containers are sharing the same base layer, then storing files is done in an efficient way. For example, a single page is loaded only once for a single file that is used across different containers. By way of example, instead of having the base layer, a .NET framework layer, and an APP layer can be combined in a single composite image (of common flat files) with each having its own layer with common flat files. Exposing individual layers allows memory sharing of those layers across composite containers because without splitting the layers a container engine may not know to have composite containers share the same flat files.

A container engine running the composite engine can manage which composite containers are using particular layers. A container engine may not be able to support sharing because when the layers are not split into two separate composite containers, the containers are not able to share the same base layer. However if the layers are split, then each container can access and share the same composite container layer. So, a first container may open a first file, and a second container can access and use the same file. Split layer memory sharing can specifically operate on a host machine where containers (process-based containers) are using a common kernel; however, during user mode, containers have their own file systems and isolation.

The composite engine interface operating with a container engine running on a host can support split layer memory sharing support functions for preparing and using a composite image associated with set of composite images for split layer memory sharing. Each composite image in the set of composite images has a corresponding set of common flat files. The implementation includes having a separate composite image per layer. Each composite image can be mounted as a read-only file system device and the files and directories contained in the container image can be accessed using a file system interface or driver (e.g. WINDOWS container isolation file system "WCIFS" filter driver). For example, a separate composite image would represent a base, .NET, and application so each layer is mounted as its own volume. So for example, a first composite container may use only a base layer, while a second composite container uses both the base (sharing with the first composite container) and the .NET layer. As such, process-based containers are able to share the same basic composite images and files. This implementation does not preclude having all three layers in the composite image; however this implementation allows for sharing between composite containers.

By way of example, at runtime, the composite image is exposed as a read-only volume, and WCIFS uses this volume as a source image similar to how WCIFS would use a single-layered container image. WCIFS can operate in this manner because the base layer of an existing container image corresponds to a normal file system image, with no special metadata. There are multiple ways to expose this volume to container for WCIFS to use a server message block protocol (e.g. vSMB). For VM-based containers using the existing container image format, image files are exposed to the VM over the SMB protocol via a transport for synthetic devices (e.g., VMBus transport). The contents of composite images can also be exposed this way, by linking the flat image parser into a dynamic link library "DLL" (e.g., vSMB DLL).

Split Layer Direct Access Memory Sharing Component

By way of background, the second host model, discussed above with reference to FIG. 2B, can specifically be used when there is a need for increased security and isolation of virtual machine, while still using container images (i.e., VM-based containers or a guest operating system "OS"). In this second host model, each guest OS has its own OS kernel (i.e., kernel isolated). These are sometimes referred to as lightweight VMs (a hybrid between VMs and containers). With guest OSs having their own kernels, split layers of composite images are still used for memory sharing. However, these guest OSs need direct access for memory sharing. Composite images can support direct access memory sharing using a file sharing interface (e.g., vSMB client). Region files of a split layer can shared on a composite image mounted on a guest OS.

With a composite container mounted inside of the guest OS there exists improved access performance for files that are stored on split layers. Generally, a guest OS can access a split layer through the server message block "SMB" client because the guest OS has to transition between the guest OS to the host. The guest OS can share the memory of a split layer using a host SMB client on the host that receives a request from the guest OS for a file in a split layer. The file is mapped into memory of the host and the file memory is shared directly with the guest OS. In this regard, the same memory (e.g., pages) of a split layer can used by the host and the guest OS. Several different composite containers can have memory of a split layer mapped from the host directly mapped into the guest OS even though the guest OS are operationally isolated.

Advantageously here, the region files of a split layer can be shared. Any file that is part of a composite image can be directly accessed (in-memory) once the composite container is mounted on the guest OS. In particular, a metadata file that is mapped into the guest OS constructively has its own virtual space, in that, information stored in the metadata file can be accessed efficiently without having to go through SMB client. Accessing the metadata file is much faster when direct-mapped to eliminate the guest-to-host transition at the individual file level. Note that accessing the metadata file the first time still has to be done with the guest-to-host transition; but after a file is loaded on the guest OS, the metadata file is accessed directly. Any region file (e.g., metadata) which is a composite image file is mapped once for increased read efficiency. Region file data still needs to be accessed over an SMB client to get the individual data. Nonetheless, any files already in memory (e.g., hot files) can be access quickly while also avoiding the guest-host-transition.

The composite engine can support several different types of remote interfaces as shown with sharing. Interfaces generally refer to portions of the composite engine that help a program or an application understand and operate with CIMFS. By way of example, legacy VM-based containers can have guest OSs that cannot mount composite images. For example, the legacy VMs may not have the driver to support mounting composite images. At a high level, an SMB client (e.g., vSMB) on the host can be updated for the host to support mounting a composite container. The SMB client exposes the composite container to the guest VM. Direct access may not be possible in this configuration because the region files are served using the SMB client over the hypervisor boundary.

In operation, at runtime, the composite image is exposed as a read-only volume, and WCIFS uses this volume as a source image similar to how WCIFS would use a single-layered container image. WCIFS can operate in this manner because the base layer of an existing container image corresponds to a normal file system image, with no special metadata. There are multiple ways to expose this volume to container for WCIFS to use a server message block protocol (e.g. vSMB). For VM-based containers using the existing container image format, image files are exposed to the VM over the SMB protocol via a transport for synthetic devices (e.g., VMBus transport). The contents of composite images can also be exposed this way, by linking the flat image parser into a dynamic link library "DLL" (e.g., vSMB DLL). The advantage of this approach is the approach is operable for legacy container images. This compatibility is important to ensure that flat images can be the exclusive image format for new container hosts. The primary downside is that metadata operations still require explicit guest-to-host communication, so the observed performance improvements are limited. Additionally, this approach only works for VM-based containers, not silo-based ones.

Moreover, conventionally, split layers are not necessary to achieve memory sharing in VM containers using direct access memory because memory sharing in that configuration is at the region file level of the image rather than at the level of individual files within the image. Containers running directly on the host share memory by sharing individual files and therefore need split layers to increase the opportunity for individual layers to be shared. A container using layers (1 . . . N−1) can only share memory with a container using layers (1 . . . N) of the same image if N−1 layers are split and mounted as individual CIM volumes.

In contrast, the composite image of all the split layers can be mounted in the VM container while still sharing memory with other VM containers using a subset of those layers. A container using a composite of N−1 layers can share memory for all its layers with another VM container using all N layers because they can both direct map the regions files corresponding to the same N−1 layers. By way of example, a composite image may be constructed such that it can be mounted as a composite of N split layers in addition to mounting each split layer individually it contemplated that optimal memory sharing can be achieved in both host-based and VM-based containers using the same composite image. In operation, because the image can be constructed as a composite of split layers each layer will have its own regions files that can be direct mapped across the VM boundary.

Dynamic Base Image

The composite engine interface can support creating a dataless images or dynamic base image and can operate with remote interfaces running on host machines to provide access to the dataless images. A composite image can be constructed a dataless image in that the set of common flat files can be included in a composite image without including data files (e.g., small data or large data). Instead, the composite image uses the metadata file of the set of common flat files to redirect to other files (e.g., files in a host). The metadata file can be a placeholder file. The metadata file is already configured to indicate where files are located within region files of the composite image, as such the placeholder file can be used to locate files in other locations.

By way of context, processed-based containers may want to use as much of the host OS (e.g., kernel files) as is allowed. A composite image can be used to scope down what is visible from the host OS. A placeholder file can be used for the container to share a copy of the file between the container and the host. This avoids duplication of the host OS. A host can have several different namespaces for a host OS to share some of the host OS files. A namespace allows container to access files from the host OS that are associated with the namespace in a safe way without sharing the entire host OS. As such, a composite container can essentially provide a restricted view of the host file system. Dataless images operate to reduce disk space and memory use, as such, no image files are copied into a local composite container volume. The nature of dataless images is that they are immutable, as such, a directory tree of the contents can be pre-computed and stored in metadata region files. Pre-computing metadata information of the contents circumvents any processing or storing of the data files. The dataless image can be created on a host machine or pre-constructed in a build lab. A composite container, at runtime, accesses metadata for request to access data that is stored in metadata. The composite container, for read request, accesses data for the read request, using the reparse points, a host file system Even though a guest OS can use its own base images (e.g., .NET and APP layers) that are separate from the host, in some situations, a guest OS, may need files in the host OS. The files in the host OS can be given a namespace and the composite container (dataless image) can be mapped to this namespace. So a guest OS mounts the composite container and uses the composite container (as a file system) to access the namespace of host OS files. Data requests using the placeholder may use a guest-to-host transition to access the files in the namespace.

Advantageously, using a composite container can be used to virtually change attributes of the host OS files. The metadata file can be used to change file names or path so the files are accessed differently through the composite container file system compared to the host OS. For example, a file in a host may be accessible without any restrictions, but on the container or guest OS can increase the security on a particular file and have only trusted access to the file. Other types of changes can be made to files using the metadata file in the composite container.

Executable Image Data Alignment

The layout manager can support file construction operations (e.g., executable image data alignment and code integrity pre-computing) to create composite images and the composite interface engine can operate with remote interfaces running on host machines supporting functionality at runtime. By way of context, files that have executable code can be stored (or laid out) differently on disk (disk alignment) than in memory (memory alignment). This is referred to as data alignment, that is, how each individual portion of data is laid out on disk. The data alignment on disk can be different from the data alignment in memory. In particular, on-disk (data) alignment may be smaller than the in-memory (data) alignment, where data alignment is associated with sections of the executable code. For example, for a given number of bytes (e.g., 512 bytes) a new page is used. And if a section stops half way through a page, the rest of the page is padded, and a new section is started on a new page. A memory manager (e.g., dynamic linker) is responsible for re-aligning the file in-memory from disk alignment to memory alignment.

On the one hand, composite images have a lot of executable files and storing each of these files at a smaller page alignment can be beneficial. For example, the base OS includes several DLL files and the .NET framework and the APP includes executables that each have extra padding every time a section ends before the end of a page. On the other hand, the smaller page alignment on disk was initially designed to save space (e.g., saving space on consumer machines). Currently, in commercial scenarios, concerns are aligned more with efficiency (e.g., computation speed) in performing computing operations. The memory manager inefficiently operates to realign files from the disk alignment to the memory alignment, which does not alleviate efficiency concerns. Bypassing realignment is of a higher priority in a commercial situation than the storage gains achieved with disk alignment that is smaller per page.

Composite files are configured to have a disk alignment that is the same as the memory alignment of memory where the executable code will be executed. The disk alignment can be larger than a conventional disk alignment with each page have padding to meet the disk alignment requirement. However, there significant are efficiencies achieved in that the files are not remapped when the files are loaded in memory. Because the files in a composite image are already in the memory alignment, an indication is communicated to the memory manager to bypass mapping from the disk alignment to the memory alignment. Advantageously, for OS virtualization, startup time metric is improved. So even with some loss in storage efficiency, there exists improvement in the startup time, where there normally would be a bottle neck because the memory manager would be realign from disk alignment to memory alignment.

In another scenario with composite images that include executable images (PE binaries). The PE binary can be made up of a number of headers and sections that indicate to a memory manager (e.g., dynamic linker that loads and links shared libraries needed by an executable at runtime to RAM) how to map the PE binary to memory. When the PE is loaded into the memory for execution, each binary section must be aligned to the binary's section alignment format. For example, the system page size of 4K. However, while stored on disk, the sections are only aligned according the binary's file alignment format. For example 512 bytes for each section. When loading the binary from disk, the memory manager reads the binary sections from their location on disk into memory that is aligned appropriately.

This means that if a typical binary is direct mapped from its disk representation into memory, it cannot be executed in place and would need to be copied into a new location. For the existing container image format, this is not a problem; when a container needs an image mapping for a binary, the host memory manager can create such a mapping and provide it to the container, de-duplicating such mappings across all containers on the system.

For composite images, though, this is a problem because the host memory manager is not able to parse the PE binary out of the middle of a region file. In other word, the region file is inaccessible to access the PE binary. An individual file system driver could construct a compatible image mapping at runtime, but it would be difficult to de-duplicate this across all the containers on the system. To fix this problem, PE binaries are parsed during flat image construction and are stored in the region files with their sections aligned to section alignment so that the binary can be executed in-place. Parsing the PE binaries in this way makes it impossible to direct map the binary as a data file, but ordinary data reads can be performed by reversing the expansion at runtime. One difference between this and the existing scheme is that the host will no longer relocate the binaries before mapping them into a guest OS.

Code Integrity

The layout manager can support file construction operations (e.g., executable image data alignment and code integrity pre-computing) to create composite images and the composite interface engine can operate with remote interfaces running on host machines supporting functionality at runtime. Code integrity with composite images is provided by pre-computing hash for a binary in a composite image. The pre-computed hash is stored within the composite image. The pre-computed hash is accessible at the composite container for code integrity. For example, the pre-computed hash is provided to a code integrity (CI) driver as a pre-computed hash extended attribute of the binary. In this way, the hashing for composite images bypasses pre-caching of validation results that are stored as an extended attribute of the binary.

Code integrity is an OS component (e.g., a kernel component) that is used to validate a binary that the OS wants to execute. Validating a binary refers to verifying that the binary has been signed. Different binaries have different signature requirements (e.g., core system state versus a normal system process). Validating signatures as part of code integrity can be challenging. Specifically, the entire executable file has to be read and a hash of the executable file is generated. Then the hash is validated using a binary signature (e.g., embedded signature in the binary). In other situations a catalog file having a list of hashes may be used instead. The binary is associated with an extended attribute that is used to store the validation results. The extended attribute storing the cache-validation results can be accessed (e.g., prior to executing the binary) to avoid performing the expensive validating process.

Containers that are used in host machines typically do not operate for long periods of time. In addition, containers rely on fast start up times to quickly provide the functionality of supported by the container (e.g., an application or service). The way host machines operate to support containers cannot adequately support the regular PC file system caching for code integrity. With the existing classic container, to mitigate this problem, each binary is pre-validated, and the result is cached on the host file system.

For composite images, caching for code integrity not straightforward because the caching code is in kernel mode and expects to receive a handle to a binary; it cannot operate on a segment of a region file. Worse, the caching code needs to access catalog files to find signatures for most of the container image binaries, and these catalog files are not accessible via normal file system APIs during container image import. And even for the classic container images, this caching scheme has problems. The extended attribute that stores the cached result is versioned, and the CI driver in older guest OSs may not be able to interpret the newer cache results produced by the host CI driver. Additionally, the CI driver uses various system inputs, such as USN journal ID, to determine the validity of the cache, and these inputs are difficult to reliably synchronize between container and host.

To keep CI performance acceptable with composite images, a new scheme is needed. Instead of relying on full pre-caching of signature validation, only the per-binary image hash is pre-computed and stored within the composite image and made available to the container CI driver via a new extended attribute. During container startup, the CI driver can validate the binary's signature against this hash, but it does not need to access every page of the binary or spend significant CPU time computing the hash. Since the image hash value is stable across CI driver versions, is easy to compute, and does not need to be invalidated by any changes to container OS state, there should never be a need to compute the image hashes at runtime. This hash computation is responsible for roughly 85% of the uncached CI validation process, so its precomputation should be sufficient to allow for the removal of the existing pre-caching scheme.

And once this hash-accelerated CI validation occurs, the CI caching scheme can operate as usual on the container scratch volume, so subsequent uses of a given binary do not need to evaluate signatures again. Caching only on the scratch volume is more reliable and correct because its invalidation semantics are a function of just the container OS state.

Aspects of the technical solution of this disclosure have been described with reference to several inventive features and advantages associated the container management components (e.g., composite engine having a composite engine interface, remote sharing manager, and layout manager, where the composite engine operates with remote interfaces and layout manager client interfaces to provide the functionality described herein). In particular, the composite engine provides composite operations for container management with the container engine, the composite operations including mounting the different types of CIMFS images and communicating with drivers (i.e., remote interfaces or client interfaces) that support executing the different types of CIMFS images. The composite operations are executed to support resource isolation and operating system (OS) virtualization functionality. Overall, the practical application of aspects of the technical solution described results in improvements based on less CPU computation, smaller memory requirements, increased efficiency and increased flexibility in container management.

Exemplary Methods for Providing Container Management Based on a Composite Image File System Engine With reference to FIGS. 3A, 3B, 4A, 4B and 5A, and 5B flow diagrams are provided illustrating methods for providing container management based on a composite image file system engine. The methods may be performed using a container management environment described herein. In embodiments, one or more computer storage media having computer-executable instructions embodied thereon that, when executed, by one or more processors can cause the one or more processors to perform the methods in the container management environment.

Figure 3A:
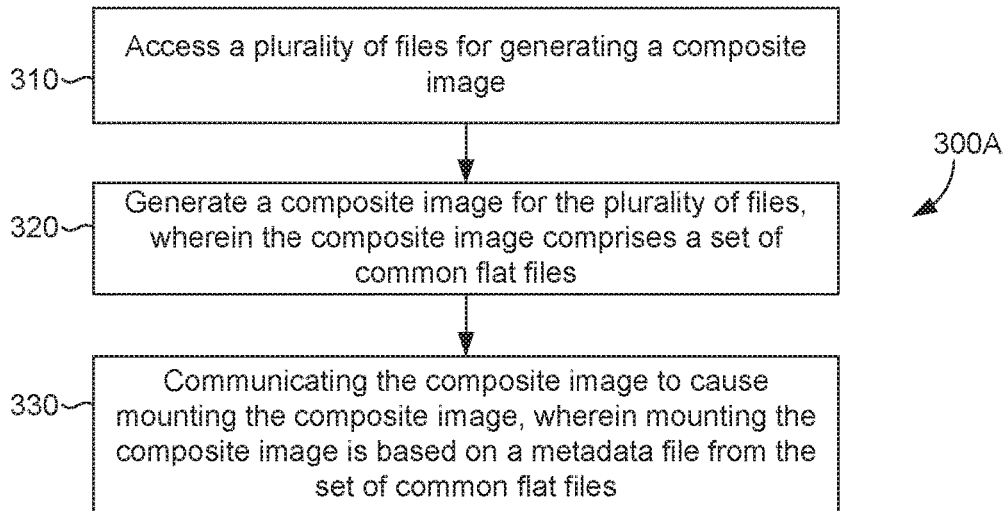
FIG. 3A provides an example method of providing composite operations using a composite image file system engine in accordance with aspects of the technology described herein.

Turning to FIG. 3A, a flow diagram is provided that illustrates a method 300A for providing container management based on a composite image file system engine. Initially at block 310, a plurality of files generating a composite image are received. At block 320, the composite image is generated for the plurality of files. The composite image includes a set of common flat files. At block 330, the composite image is communicated to cause mounting of the composite image. Mounting the composite image is based on a metadata file from the set of common flat files.

Figure 3B:
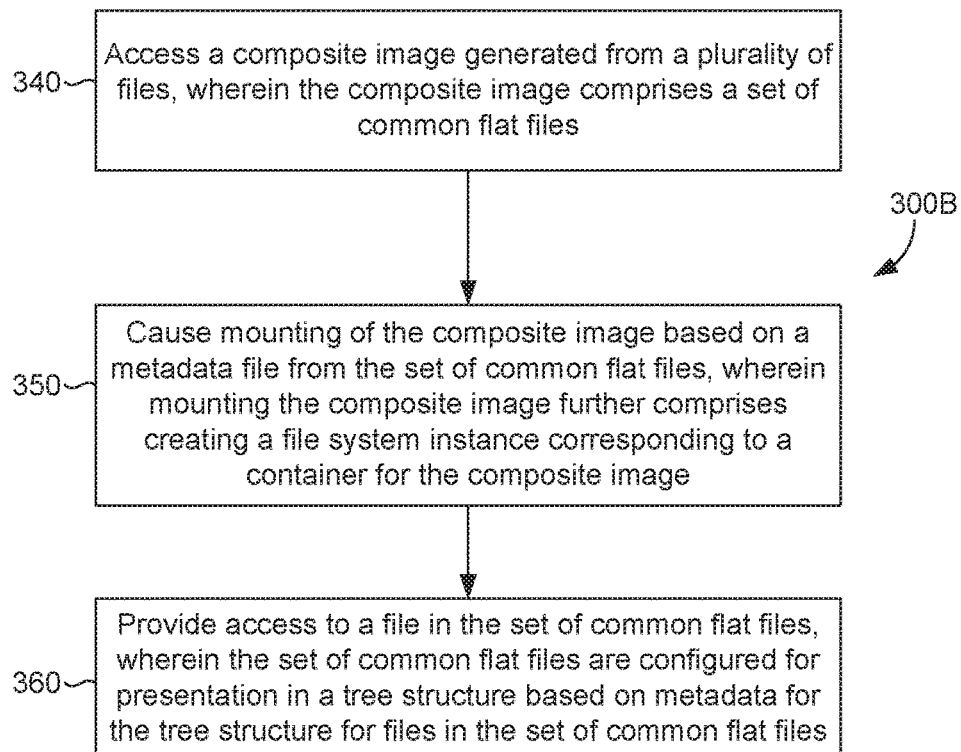
FIG. 3B provides an example method of providing composite operations using a composite image file system engine in accordance with aspects of the technology described herein.

Turning to FIG. 3B, a flow diagram is provided that illustrates a method 300B for providing container management based on a composite image file system engine. Initially at block 340, a composite image is accessed, the composite image is generated from a plurality of files. The composite image comprises a set of common flat files. At block 350, mounting of the composite image is caused, where mounting the composite image is mounted based on a metadata file from the set of common flat files. Mounting the composite image further comprises creating a file system instance corresponding to a container for the composite image. At block 360, access to a file in the set of common flat files is provided. The set of common flat files are configured for presentation in a tree structure based on metadata for the tree structure for files in the set of common flat files.

Figure 4A:
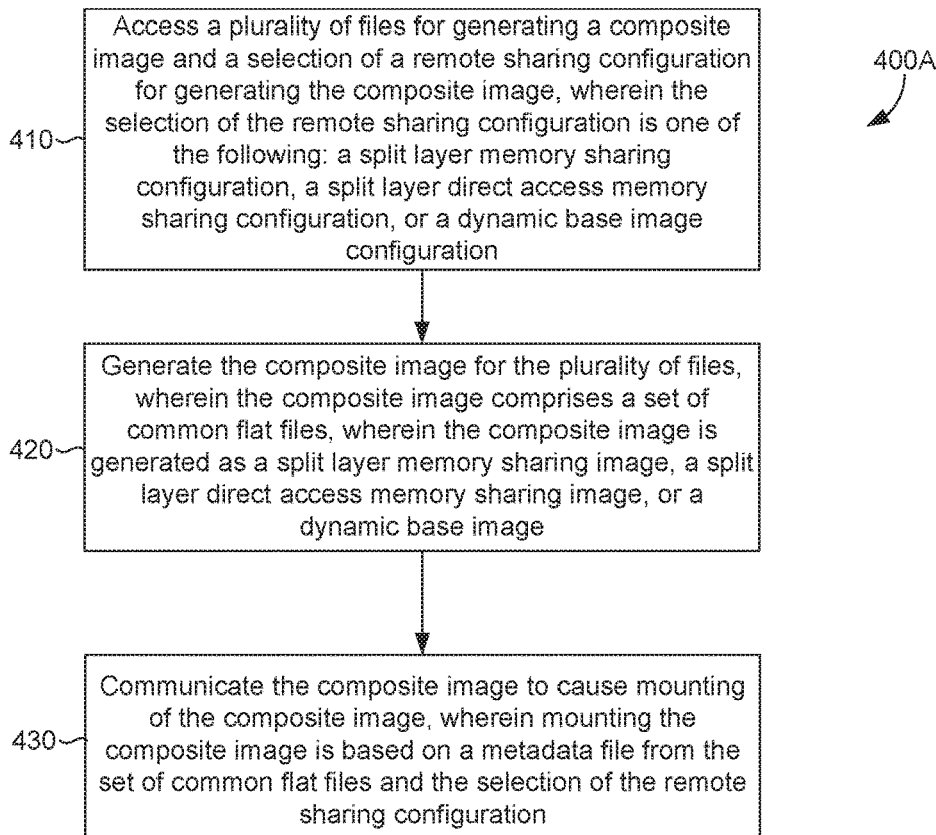
FIG. 4A provides an example method of providing composite operations using a composite image file system engine in accordance with aspects of the technology described herein.

Turning to FIG. 4A, a flow diagram is provided that illustrates a method 400A for providing container management based on a composite image file system engine. Initially at block 410, a plurality of files for generating a composite image and a selection of a remote sharing configuration generating the composite image are accessed. The selection of the remote sharing configuration is one of the following: split layer memory sharing configuration, a split layer direct access memory sharing configuration, or a dynamic base image configuration. At block 420, the composite image for the plurality of files is generated. The composite image comprises a set of common flat files. The composite image is generated as a split layer memory sharing image, a split layer direct access memory sharing image, or dynamic base image. At block 430, the composite image is communicated to cause mounting of the composite image. Mounting the composite image is based on a metadata file from the set of common flat files and the selection of the remote sharing configuration.

Figure 4B:
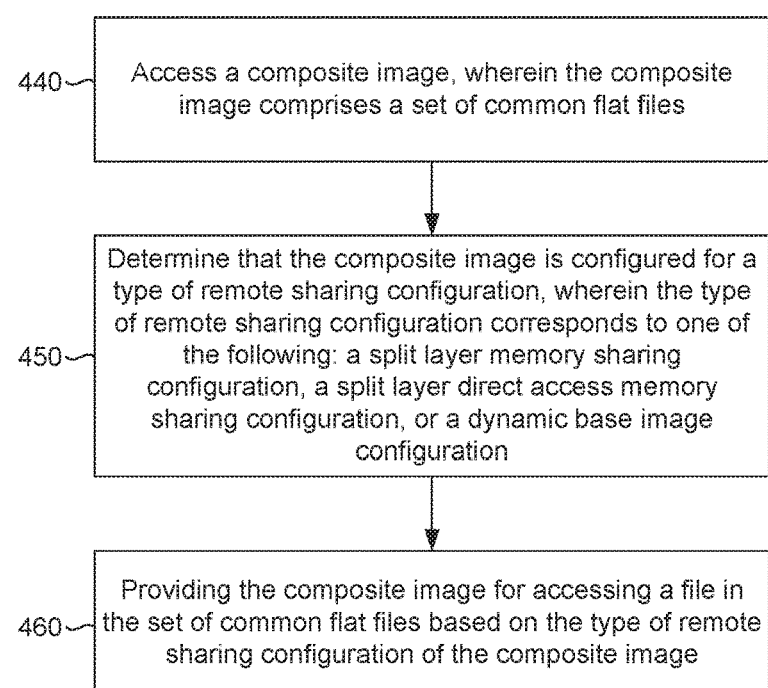
FIG. 4B provides an example method of providing composite operations using a composite image file system engine in accordance with aspects of the technology described herein.

Turning to FIG. 4B, a flow diagram is provided that illustrates a method 300B for providing container management based on a composite image file system engine. Initially at block 440, a composite image is accessed. The composite image comprises a set of common flat files. At block 450, a determination that the composite image is configured for a type of remote sharing configuration is made. The type of remote sharing configuration correspond to one of the following: split layer memory sharing configuration, a split layer direct access memory sharing configuration, or a dynamic base image configuration. At block 460, the composite image is provided for access a file in the set of common files based on the type of remote sharing configuration of the composite image.

Figure 5A:
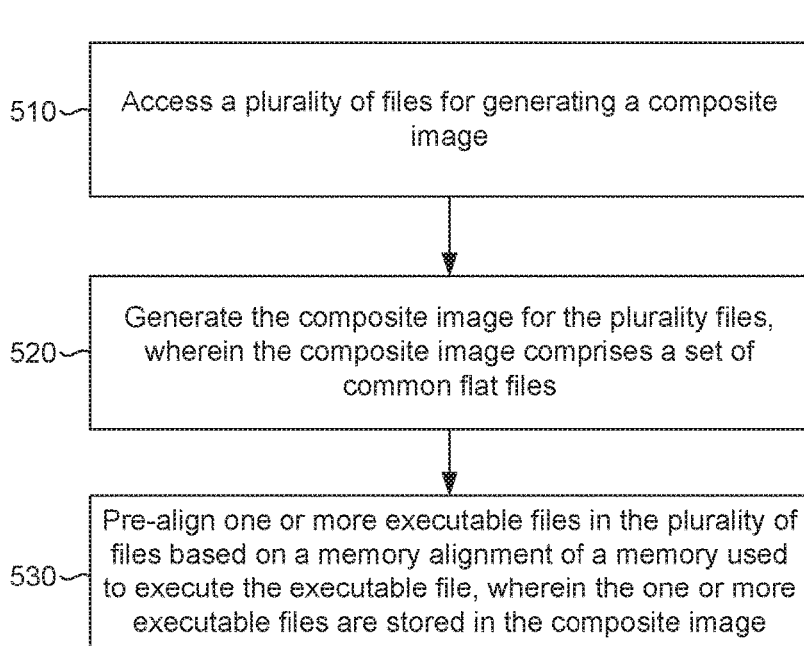
FIG. 5A provides an example method of providing composite operations using a composite image file system engine in accordance with aspects of the technology described herein.

Turning to FIG. 5A, a flow diagram is provided that illustrates a method 500A for providing container management based on a composite image file system engine. Initially at block 510, a plurality of files for generating a composite image are accessed. At block 520, the composite image is generated for the plurality of files. The composite image comprises a set of common flat files. At block 530, generating the composite image for the plurality of files comprises pre-aligning one or more executable files in the plurality of files based on a memory alignment of a memory used to execute the executable file. The one or more executable files are stored in the composite image.

Figure 5B:
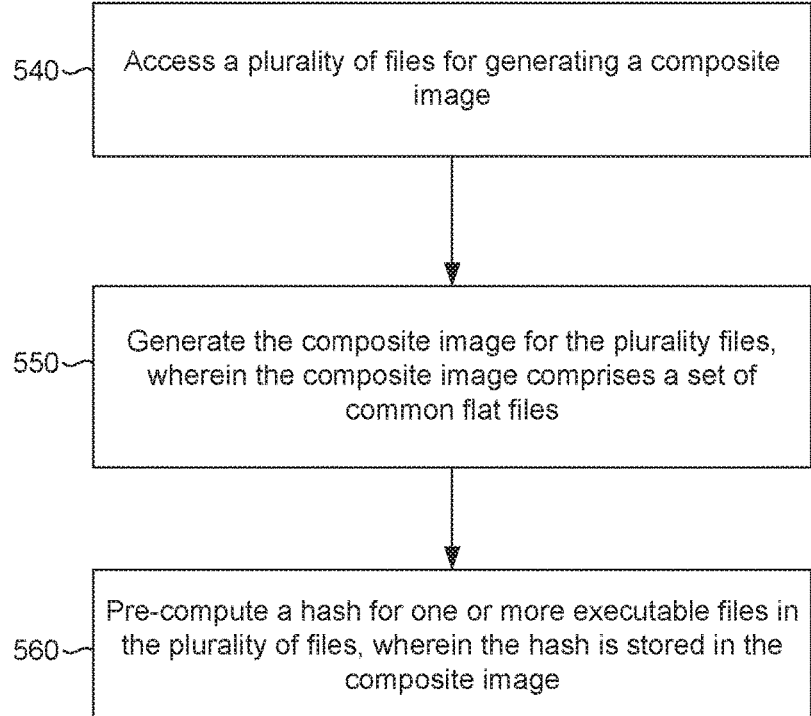
FIG. 5B provides an example method of providing composite operations using a composite image file system engine in accordance with aspects of the technology described herein.

Turning to FIG. 5B, a flow diagram is provided that illustrates a method 500B for providing container management based on a composite image file system engine. Initially at block 540, a plurality of files for generating a composite image are accessed. At block 550, the composite image is generated for the plurality of files. The composite image comprises a set of common flat files. At block 560, generating the composite image for the plurality of files comprises pre-computing a hash for one or more executable files in the plurality of files. The hash is stored in the composite image.

Example Container Management System Environment

With reference to the container management system environment 600 ("container management system"), which includes a container management system for performing embodiments described herein that support the functionality of the technical solution. The container management system includes distributed components of the container management system that are communicatively implemented in combination with other integrated components that implement aspects of the technical solution. The container management system environment 600 refers to the hardware architecture and software framework that support the functionality of the technical solution.

Figure 6:
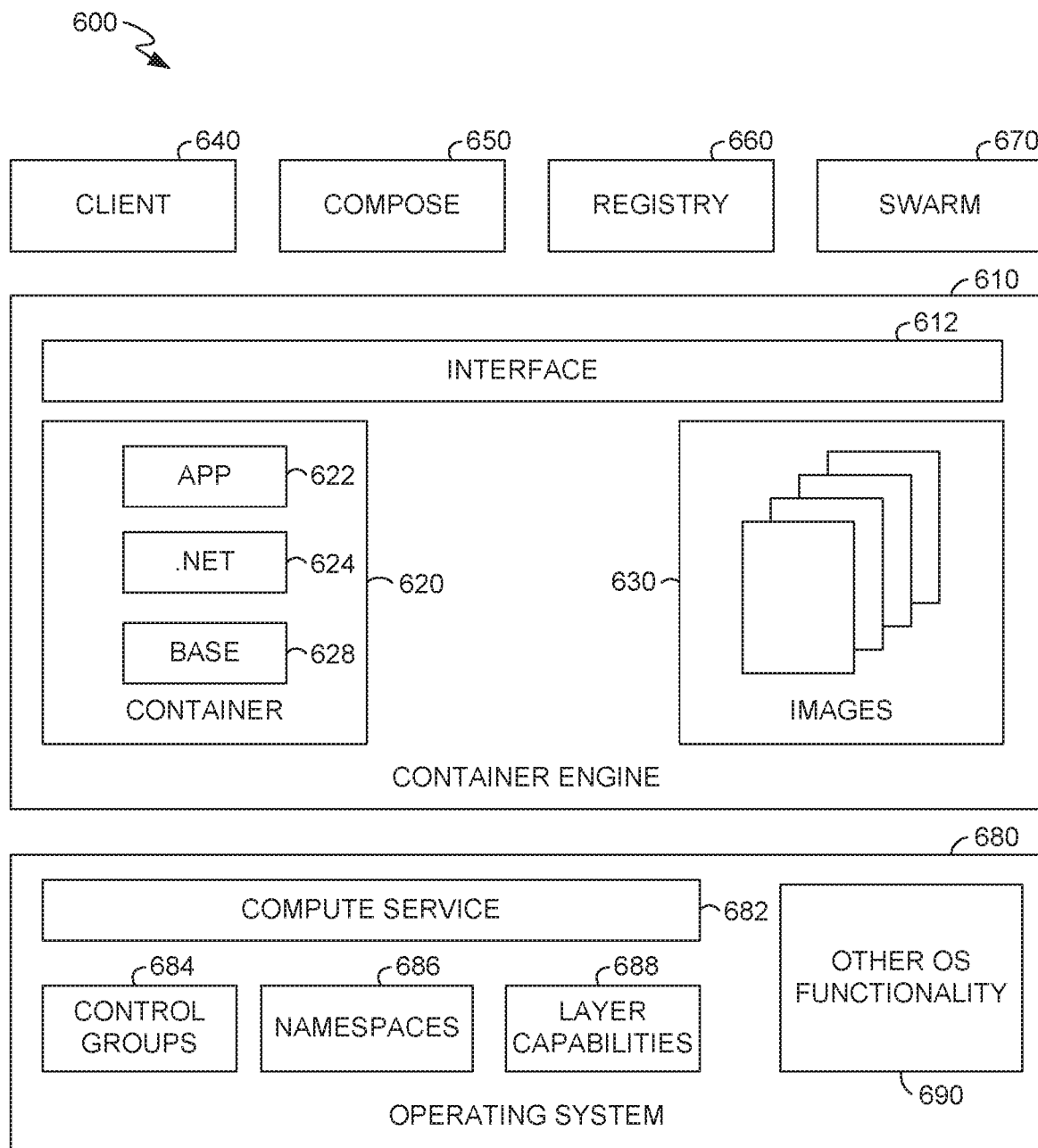
FIG. 6 provides a block diagram of an example container management system environment suitable for use in implementing aspects of the technology described herein.

At a high level, the container management system (e.g., DOCKER) provides support for developing and delivering software in packages called containers in a distributed computing system. Containers are created from images that specify precise contents. Containers, in particular, can be supported (e.g., managed, created, mounted, and accessed) using the container management system that includes several components that are integrated and communicate to provide container functionality. For example, the container management system can be a set of platform-as-a-service products that use OS-level virtualization to provide containers that are isolated from one another and bundled with their own software, libraries, and configuration files. The containers can communicate with each other through well-defined channels. Containers can be run by a single operating With continued reference to FIG. 6, FIG. 6 shows a high level architecture file system environment 600 having components in accordance with implementations of the present disclosure. It should be understood that the arrangements described herein are set forth only as examples and other arrangements, instead of those shown, are contemplated. Among other components not shown, the container management system includes container engine 610, interface 612, container 620 (including APP 622, .NET 624, BASE 628) and images 630. The container management system further includes client 640, compose 650, registry 660, swarm 670 and operating system 680 (including compute service 682, control groups 684, namespaces 686, layer capabilities 688, and other OS functionality 690).

The container management system can support containers and virtual machines (VMs) with characteristics including isolated environments, portability between host machines, and resource governance. Containers can be distinguished from VMs based on level of virtualization (i.e., OS virtualization for containers compared to hardware virtualization for VMs), OS functionality (i.e., containers share the OS kernel mode with other containers and the container host, VMs can full OS and dedicated kernel mode available, and architecture modularity models (e.g., containers share underlying resource of the container host and build an image that is needed to run an application, while VMs are built with full OS and depending on the application strip down functionality).

The container management system can support kernel mode of an operating system that has been implemented for drivers that need to have unrestricted access to the underlying hardware. The container management system can also support user made that use the OS APIs to access hardware or memory. Code that is running within the kernel mode can have direct access to resource and share the same memory locations and virtual address space as the operating system and other kernel drivers. In user mode, the code runs in a separate process (e.g., user space), which has its own dedicated set of memory location (private virtual address space). Because each application's virtual address space is private, one application cannot alter data that belong to another application. Each application runs in isolation, and if an application crashes, the crash is limited to that application.

The container management system provide a complete environment to execute and run applications including an operating system having compute services, control groups, namespaces, layer capabilities, and other OS functionality. The container management system also includes a container engine to support container-related actions based commands and an interface to a client. In operation, the container engine constantly listens via an interface for API requests and processes them. A client can interact with the container engine (e.g., command-line interface of the client) manage (e.g., compose) container instances. The client sends commands to the container engine to perform operations.

Container engine can include a persistent background process (e.g., a daemon) that manages the images, containers, networks, and storage volumes. Images can refer to read-only binary templates that can build containers. Images can be used to store and ship applications. An image can be used to build a container or customized to add additional elements to extend a current configuration of the image. Containers are encapsulated environments in which applications are run. A container can be defined by an image and any additional configuration operations provide on a starting container, including and not limited to the network connections and storage options.

The container engine provides supports communications for isolated container components and other components using different drivers. For example, an overlay driver can support swarm services (i.e., clustering and scheduling service tool) for multiple applications, or a host driver removes the network isolation between containers when network isolation is not required. The container engine include registries that are services that provide locations from where images can be stored and download (i.e., the container engine registry contains repositories for one or more images). In this way, the container engine and the container management system support conventional resource isolation and OS virtualization.

Example Distributed Computing Environment

Figure 7:
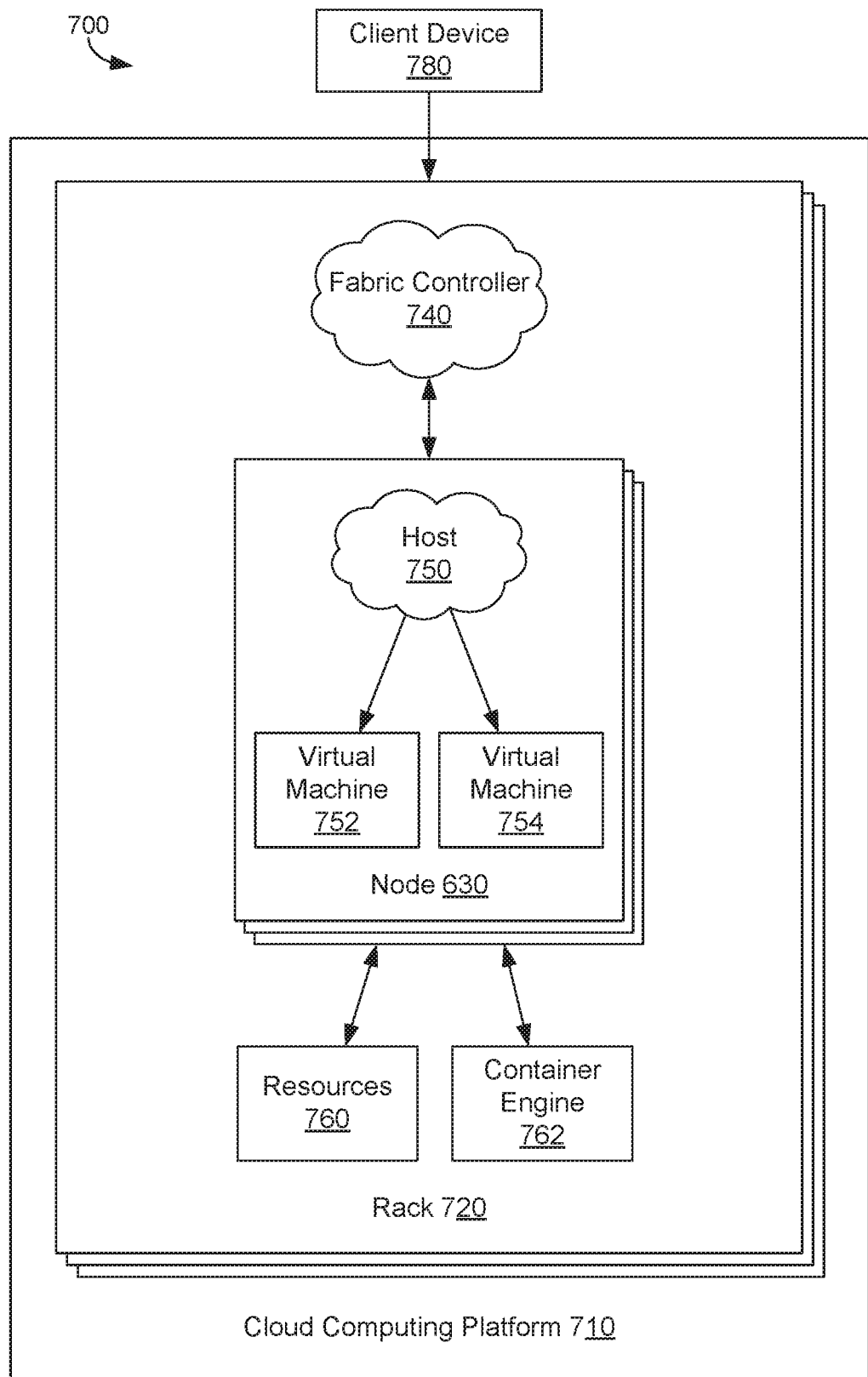
FIG. 7 provides a block diagram of an example distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) and a container engine 762 in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 800 described with reference to FIG. 8, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Operating Environment

Figure 8:
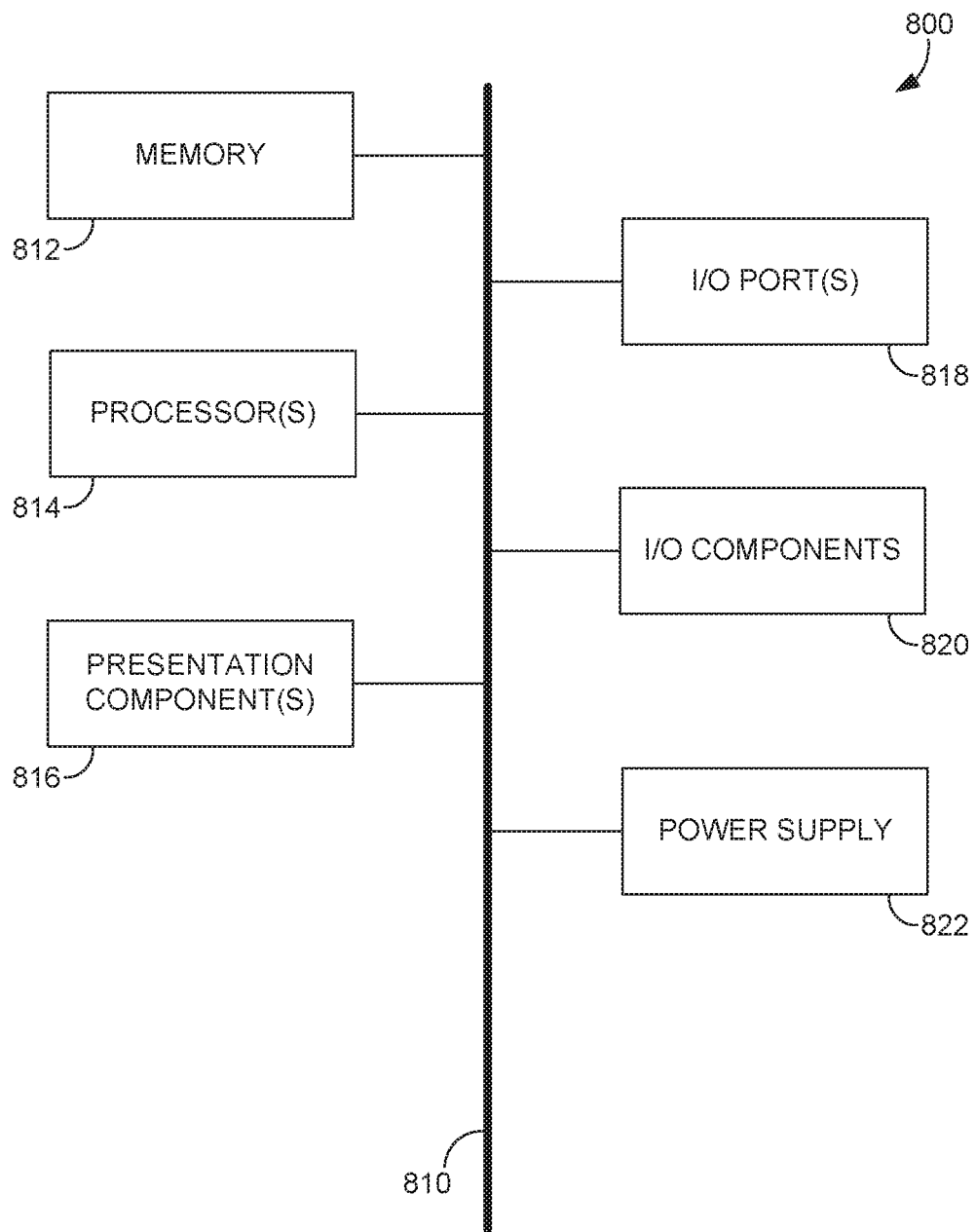
FIG. 8 is a block diagram of an example computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation,"

"server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

It will be understood that certain features and sub-combinations are of utility and may be employed without reference to other features or sub-combinations. This is contemplated by and is within the scope of the claims.

What is claimed is:

1. A computerized system comprising:
    one or more computer processors; and
    computer memory storing computer-useable instructions that, when used by the one or more computer processors, cause the one or more computer processors to perform operations comprising:
        accessing a plurality of files;
        accessing a selection of a remote sharing configuration for generating a composite image, wherein the selection of the remote sharing configuration is one of the following: a split layer memory sharing configuration, a split layer direct access memory sharing configuration, or a dynamic base image configuration;
        generating the composite image for the plurality of files, wherein the composite image comprises a set of common flat files that is associated with a directory structure metadata of a tree structure format, wherein, based on the selection of the remote sharing configuration, the composite image is generated as a split layer memory sharing image, a split layer direct access memory sharing image, or a dynamic base image; and
        causing the composite image to be sequentially written to a location in sequence based on a metadata file, from the set of common flat files, that includes the directory structure metadata and the selection of the remote sharing configuration.

2. The computerized system of claim 1, the composite image comprising a remote interface configuration that corresponds to the split layer memory sharing configuration, wherein the composite image is operable with individual layers having a corresponding layer-based set of common flat files.

3. The computerized of claim 2, wherein exposing each layer that comprises the corresponding layer-based set of common flat files supports file sharing in that a file in a layer is accessible across multiple composite containers.

4. The computerized system of claim 1, the composite image comprising a remote interface configuration that corresponds to the split layer direct access memory sharing configuration, wherein the composite image is operable with a split layer having a set of layer-based common flat files.

5. The computerized system of claim 4, wherein the split layer is shared between the composite image running as a composite container in a virtual machine and a host hosting the virtual machine.

6. The computerized system of claim 1, the composite image comprising a remote interface configuration that corresponds to the dynamic base image configuration, wherein the composite image is operable based on the metadata file without including data files in the set of common flat files, wherein the dynamic base image is operable in a restricted view of files in a host operating system.

7. The computerized system of claim 1, wherein the split layer memory sharing configuration is associated with process-based containers and the direct access memory sharing configuration is associated with virtual machine-based containers.

8. One or more computer-storage media having computer-executable instructions embodied thereon that, when executed by a computing system having a processor and memory, cause the processor to:
    access a plurality of files;
    access a selection of a remote sharing configuration for generating a composite image, wherein the selection of the remote sharing configuration is one of the following: a split layer memory sharing configuration, a split layer direct access memory sharing configuration, or a dynamic base image configuration;
    generate the composite image for the plurality of files, wherein the composite image comprises a set of common flat files that is associated with a directory structure metadata of a tree structure format, wherein, based on the selection of the remote sharing configuration, the composite image is generated as a split layer memory sharing image, a split layer direct access memory sharing image, or a dynamic base image; and
    cause the composite image to be sequentially written to a location in sequence based on a metadata file, from the set of common flat files, that includes the directory structure metadata and the selection of the remote sharing configuration.

9. The one or more computer-storage media of claim 8, the composite image comprising a remote interface configuration that corresponds to the split layer memory sharing configuration, wherein the composite image is operable with individual layers having a corresponding layer-based set of common flat files.

10. The one or more computer-storage media of claim 9, wherein exposing each layer that comprises the corresponding layer-based set of common flat files supports file sharing in that a file in a layer is accessible across multiple composite containers.

11. The one or more computer-storage media of claim 8, the composite image comprising a remote interface configuration that corresponds to the split layer direct access memory sharing configuration, wherein the composite image is operable with a split layer having a set of layer-based common flat files.

12. The one or more computer-storage media of claim 11, wherein the split layer is shared between the composite image running as a composite container in a virtual machine and a host hosting the virtual machine.

13. The one or more computer-storage media of claim 8, the composite image comprising a remote interface configuration that corresponds with the dynamic base image configuration, wherein the composite image is operable based on the metadata file without including data files in the set of common flat files, wherein the dynamic base image is operable in a restricted view of files in a host operating system.

14. The one or more computer-storage media of claim 8, wherein the split layer memory sharing configuration is associated with process-based containers and the direct access memory sharing configuration is associated with virtual machine-based containers.

15. A computer-implemented method comprising:
accessing a plurality of files;
accessing a selection of a remote sharing configuration for generating a composite image, wherein the selection of the remote sharing configuration is one of the following: a split layer memory sharing configuration, a split layer direct access memory sharing configuration, or a dynamic base image configuration;
generating the composite image for the plurality of files, wherein the composite image comprises a set of common flat files that is associated with a directory structure metadata of a tree structure format, wherein, based on the selection of the remote sharing configuration, the composite image is generated as a split layer memory sharing image, a split layer direct access memory sharing image, or a dynamic base image; and
causing the composite image to be sequentially written to a location in sequence based on a metadata file, from the set of common flat files, that includes the directory structure metadata and the selection of the remote sharing configuration.

16. The computer-implemented method of claim 15, the composite image comprising a remote interface configuration that corresponds to the split layer memory sharing configuration, wherein the composite image is operable with individual layers having a corresponding layer-based set of common flat files.

17. The computer-implemented method of claim 16, wherein exposing each layer that comprises the corresponding layer-based set of common flat files supports file sharing in that a file in a layer is accessible across multiple composite containers.

18. The computer-implemented method of claim 15, the composite image comprising a remote interface configuration that corresponds to the split layer direct access memory sharing configuration, wherein the composite image is operable with a split layer having a set of layer-based common flat.

19. The computer-implemented method of claim 18, wherein the split layer is shared between the composite image running as a composite container in a virtual machine and a host hosting the virtual machine.

20. The computer-implemented method of claim 15, the composite image comprising a remote interface configuration that corresponds with the dynamic base image configuration, wherein the composite image is operable based on the metadata file without including data files in the set of common flat files, wherein the dynamic base image is operable in a restricted view of files in a host operating system.

* * * * *